Aug. 13, 1946. W. H. RODEFELD 2,405,756
HAY HARVESTER
Filed Jan. 6, 1945
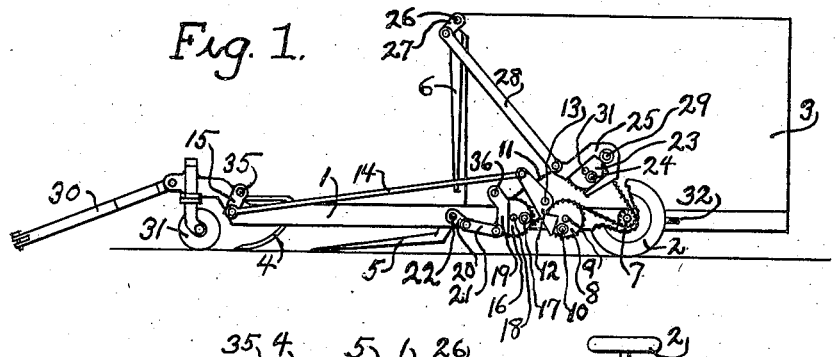
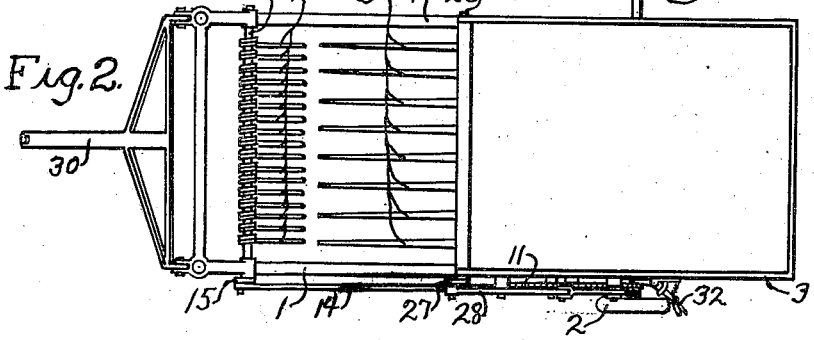
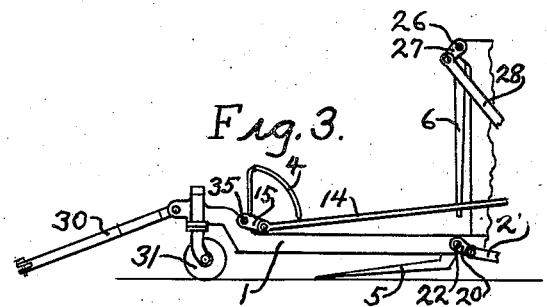
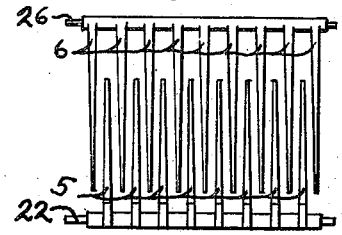
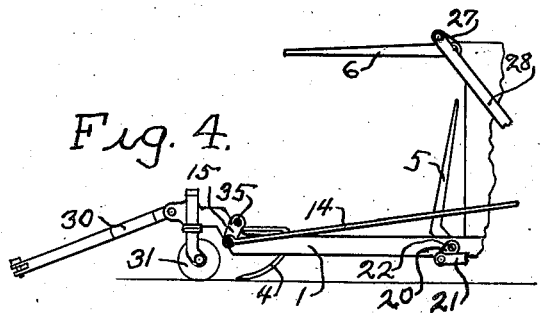
Inventor:
William H. Rodefeld.

Patented Aug. 13, 1946

2,405,756

UNITED STATES PATENT OFFICE 2,405,756

HAY HARVESTER

William H. Rodefeld, Richmond, Ind.

Application January 6, 1945, Serial No. 571,556

6 Claims. (Cl. 214—79)

My present invention relates to machinery for handling hay and similar material.

The principal object of this invention is the provision of a machine combining raking, loading, holding, and transporting mechanism to provide means to rake, take up, and remove hay and similar material from the field more efficiently.

Another object of this invention is the provision of a machine with which one man can do work that heretofore required more than one machine and more than one man.

I attain these objects by mechanism illustrated in the accompanying drawing, in which—

Figure 1 is a side view of the machine and shows a conveyance in combination with a set of raking teeth near the front thereof and a set of loading teeth back of the raking teeth and a set of holding arms above the loading teeth and mechanism to operate the raking teeth and the loading teeth and the holding arms.

Figure 2 is a plan view.

Figure 3 is a partial side view showing the raking teeth in raised position.

Figure 4 is a partial side view showing the loading teeth in raised position and the holding arms in raised position.

Figure 5 is a partial front view showing only the loading teeth and the holding arms with the loading teeth in raised position and the holding arms in lowered position and this view shows how the loading teeth and the holding arms are spaced to pass between each other.

Figure 6 is an enlarged partial top view showing the left rear wheel of the conveyance and a sprocket that drives the mechanism that operates the raking and loading teeth and the holding arms and the means for engaging and disengaging the driving sprocket and the wheel hub to put the mechanism in or out of operation.

Similar numerals refer to similar parts throughout the several views.

The frame 1, the rear wheels 2, the sides 3, the front wheels 31 and the tongue 30 constitute the conveyance.

The raking teeth 4 rake up material as the machine is pulled forward and then drop the material in a bunch by being raised to the position shown in Figure 3. The loading teeth 5 then pick up the bunched material as the machine moves forward. The raking teeth 4 return to raking position immediately after passing over a dropped bunch of material to rake another bunch of material and while the raking teeth 4 are down the loading teeth 5 swing up to the positions shown in Figures 4 and 5 to put the material they have picked up onto the conveyance and then return down to pick up position before the raking teeth 4 drop another bunch of material.

Immediately after the loading teeth have swung up and rearward to put material on the conveyance the holding arms 6 swing down and being spaced to pass between the loading teeth they come against the material and the loading teeth then return to the ground and the holding arms 6 remain against the material to hold it on the conveyance until the loading teeth again rise to put more material on the conveyance than the holding arms 6 swing quickly up out of the way and then again swing down and against the material before the loading teeth again return to the ground.

The movements of the raking teeth 4 and the loading teeth 5 and the holding arms 6 occur in proper order while the machine moves continually forward and the loading teeth and the holding arms crowd the material back into the conveyance until the conveyance is full and then the mechanism is put out of operation by shifting the lever 32.

The front wheels 31 of the conveyance operate on the castor wheel principle to permit turning.

A sprocket 8, a sprocket 16 and a sprocket 23 and the drive sprocket 7 are connected by a chain 11.

The sprocket 8 rotates on a stationary stub shaft 9 and carries an eccentrically positioned roller 10 that strikes a rocker arm 12 carried by a stationary stub shaft 13 and the rocker arm 12 is connected by a rod 14 to an arm 15 which is secured to the shaft 35 that carries the raking teeth 4. Movement of the rocker arm 12 by the roller 10 on the sprocket 8 therefore raises the raking teeth 4.

The sprocket 16 rotates on a stub shaft 18 and carries an eccentrically positioned roller 17 that strikes a lever 19 that is carried by a stub shaft 36 and is connected by a link 21 to an arm 20 on a shaft 22 that carries the loading teeth 5. Movement of the lever 19 by the rollers 17 on the sprocket 16 raises the loading teeth 5.

A sprocket 23 rotates on a stub shaft 31 and carries an eccentrically positioned roller 24. A two arm rocker 25 carried by a stub shaft 29 is connected by a bar 28 to an arm 27 which is secured to a shaft 26 that carries the holding arms 6. The two arms of the rocker 25 are struck alternately by the roller 24 on the sprocket 23 and when the roller 24 strikes the upper arm of rocker 25 the holding arms are raised and when the roller 24 strikes the lower arm of rocker 25 the holding arms 6 are lowered.

The hub 33 of the sprocket 7 has clutch jaws to engage similar clutch jaws on the hub 34 of the wheel 2 and the clutch jaws are engaged or disengaged to put the mechanism in or out of operation.

Having now described the invention, what I claim and desire to secure by Letters Patent of the United States is:

1. A machine to handle hay and similar material consisting of a wheel supported frame carrying a set of raking teeth near the front end thereof arranged to rake material into bunches as the machine moves forward and to rise and drop the said bunches and a set of loading teeth located behind the raking teeth with their front ends arranged to slide on the ground under the bunched material dropped by the raking teeth and their back ends carried by the frame in such manner as to permit the front ends to be raised to carry the material upward and backward to a carrying compartment and a set of holding arms supported above the said loading teeth and arranged to swing downward and rearward to pass between the said loading teeth to hold the material in the carrying compartment.

2. A harvesting machine consisting of a wheeled chassis having a set of raking teeth arranged to rake material as the machine moves forward and then drop it in a bunch and having a set of loading teeth hinged to the said chassis back of the said raking teeth and arranged to extend forward and to pass under the bunched material dropped by the said raking teeth as the machine moves forward and then to swing upward and elevate the said material to a carrying compartment on the said chassis and having a set of holding arms arranged to pass between the said loading teeth while they are up and to hold the said material in the said compartment and having mechanism to operate the said raking teeth and loading teeth and holding arms.

3. A machine to rake, take up, and transport hay and similar material having a set of raking teeth arranged to rake material as the machine moves forward and to rise at intervals and drop the raked material bunched and then return to the ground for additional raking and having a set of loading teeth behind the said raking teeth arranged to slide under the bunched material dropped by the raking teeth and then swing upward to carry the material to a holding compartment and a set of holding arms arranged to press and hold the material in the holding compartment and mechanism to operate the raking teeth and the loading teeth and the holding arms and to time the movements thereof so the loading teeth are down when the raking teeth rise and so the raking teeth remain down when the loading teeth are up and so the holding arms remain against the material while the loading teeth are down.

4. A self-loading conveyance to take up and transport hay and similar material while moving forward having a carrying compartment open at the front, a set of teeth to rake material and drop it in bunches, a second set of teeth to slide under the said bunches and then to swing upward and elevate the material to the carrying compartment and a set of arms to press the material in the carrying compartment and hold it therein and to serve as a closing means to the open front of the carrying compartment.

5. A machine for harvesting hay and similar material consisting of a wheeled chassis supporting a load carrying compartment open at the front and having a set of loading teeth hinged to the chassis near the said open front and extending forward with the front ends thereof resting on the ground when they are in down position and extending upward at the open front of the carrying compartment when up and a set of holding arms arranged to pass between the said loading teeth when they are up to press material in the carrying compartment and to hold it therein when the said loading teeth are in down position and a set of raking teeth near the front of the chassis to rake material as the machine moves forward and arranged to drop it bunched in front of the said loading teeth.

6. A machine to rake and take up and transport hay and similar material consisting of a wheeled chassis having a carrying compartment open at the front and having a set of raking teeth near the front of said chassis arranged to rake material as the machine moves forward and to rise at intervals to drop the raked material in bunches and having a set of loading teeth behind the raking teeth and hinged to the machine and extending forward toward the raking teeth when in down position and arranged so that the forward ends thereof slide on the ground and under the bunched material and so that they swing upward to elevate the said material to the said carrying compartment and having a set of holding arms hinged so they may swing to pass between and through the loading teeth when the same are up to press material into the carrying compartment and arranged to remain against the material therein while the loading teeth return to the ground to take up more material and to swing upward out of the way when the loading teeth elevate the next bunch of material and then to swing again through the loading teeth to press and hold the material and having mechanism to operate the raking teeth and the loading teeth and the holding arms.

WILLIAM H. RODEFELD.